United States Patent
Vemuri et al.

(10) Patent No.: US 8,949,670 B1
(45) Date of Patent: Feb. 3, 2015

(54) METHOD AND SYSTEM FOR TRANSLATING MIND MAPS TO TEST MANAGEMENT UTILITY TEST CASES

(71) Applicant: EMC Corporation, Hopkinton, MA (US)

(72) Inventors: Lakshmi Chandana Vemuri, Bangalore (IN); Arun Dwajan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 304 days.

(21) Appl. No.: 13/627,086

(22) Filed: Sep. 26, 2012

(51) Int. Cl.
*G06F 11/00* (2006.01)

(52) U.S. Cl.
USPC .......................................................... 714/33

(58) Field of Classification Search
CPC ............ G06F 11/3684; G06F 11/3696; G06F 11/2257; G06F 11/327; G06F 11/3672; G06F 17/2205; G06F 17/2229; G06F 17/2241; G06F 17/2247; G06F 17/2264; G06F 17/2785; G06F 17/289; G06F 17/30864
USPC .......................................................... 714/33
See application file for complete search history.

(56) References Cited

U.S. PATENT DOCUMENTS

| | | | | |
|---|---|---|---|---|
| 5,295,230 A * | 3/1994 | Kung | | 706/59 |
| 5,920,314 A * | 7/1999 | Maesano et al. | | 715/804 |
| 8,381,178 B2 * | 2/2013 | Martino et al. | | 717/109 |
| 2004/0103396 A1 * | 5/2004 | Nehab | | 717/127 |
| 2006/0020919 A1 * | 1/2006 | King | | 717/124 |
| 2008/0109475 A1 * | 5/2008 | Burmester et al. | | 707/102 |
| 2009/0043592 A1 * | 2/2009 | Heimann et al. | | 705/1 |
| 2009/0089656 A1 * | 4/2009 | McAfee et al. | | 715/234 |
| 2009/0157630 A1 * | 6/2009 | Yuan | | 707/3 |
| 2010/0205586 A1 * | 8/2010 | Mun | | 717/140 |
| 2011/0074574 A1 * | 3/2011 | Becker et al. | | 340/540 |
| 2013/0297597 A1 * | 11/2013 | Shaastri | | 707/736 |
| 2013/0346948 A1 * | 12/2013 | Zhang | | 717/125 |

* cited by examiner

*Primary Examiner* — Bryce Bonzo
(74) *Attorney, Agent, or Firm* — Dergosits & Noah LLP; Todd A. Noah

(57) ABSTRACT

Translating mind maps to test management utility test cases is described. A computer executes a translator. The translator exports a mind map to a text file, wherein the mind map comprises mind map nodes. The translator populates an integration properties file with an exported text file location. The translator defines mapping, in the integration properties file, between the mind map nodes and a test case for a test management utility. The translator sets the mapping between the mind map nodes and test case details for the test case based on the integration properties file. The translator populates the test case details with the mind map nodes.

20 Claims, 4 Drawing Sheets

METHOD AND SYSTEM FOR TRANSLATING MIND MAPS TO TEST MANAGEMENT UTILITY TEST CASES

BACKGROUND

In software engineering, a test case is a set of conditions or variables under which a tester will determine whether or not an application or a software system is functioning correctly. Many test cases may be required to evaluate whether an application or a software system is considered sufficiently scrutinized to be released. In order to fully test that all the requirements of an application or a software system are met, there must be at least two test cases for each requirement, one positive test and one negative test. If a requirement has sub-requirements, each sub-requirement must have at least two test cases, one positive test and one negative test. Written test cases should include a description of the functionality to be tested, and the preparation required to ensure that the test can be conducted. The traditional approach to writing test cases is to use a test management utility which enables a tester to write and record the test cases.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
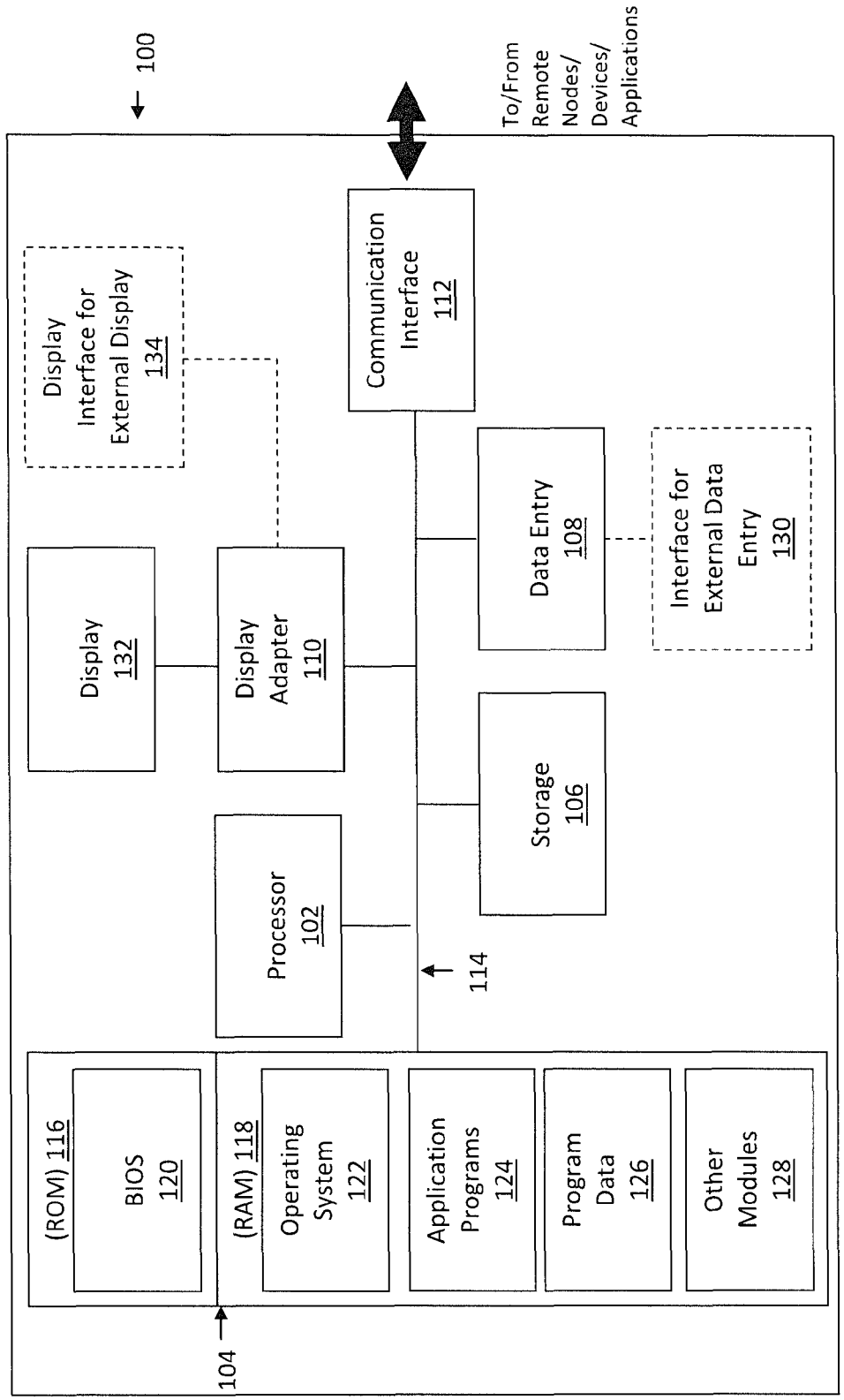
FIG. 1 is a block diagram illustrating an example hardware device in which the subject matter may be implemented.

The amount of information to be entered for every test case and the template used by test management utilities can often be a hindrance in deriving a good coverage of test scenarios because test management utilities require a tester to enter parameters for a large number of fields, with many of the fields including redundant parameters or somewhat trivial details. This lengthy and time consuming process may create a disconnect between a tester thinking about test cases and the tester writing test cases. Furthermore, the context of the test cases for a given use case may be difficult to understand in the test reports generated by many test management utilities. Reviewing and updating a test case recorded in a test management utility may be a challenge due to the lack of context of the test scenarios, a sometimes excessive amount of test case details, and the complexity of the test management utility.

The subject matter presented herein extends the functionality of mind maps to the writing of test cases. Mind maps are used to generate, visualize, structure, and classify ideas, and as an aid to studying and organizing information, solving problems and making decisions. A mind map is often created around a central word or text, to which associated ideas, words and concepts are added. Major categories radiate from a central node, and lesser categories are sub-branches of larger branches, or nodes. Categories can represent words, ideas, tasks, or other items related to a central key word or idea. Mind mapping software applications can be used to organize large amounts of information, combining spatial organization, dynamic hierarchical structuring and node folding. An example of a simple mind map is described below in reference to FIG. 3.

Embodiments of the present disclosure provide a translator that translates test cases written as the mind maps to test cases in the test management utilities. The translator exports a mind map to a text file, populates an integration properties file with the exported text file location, and defines mapping, in the integration properties file, between the mind map's nodes and a test case for a test management utility. The translator sets the mapping between the mind map nodes and test case details for the test case based on the integration properties file, and populates the test case details with the mind map nodes. The translator can be extended to read data from any available mind mapping application and export it to any available test management utility.

An advantage with using mind maps to write test cases is the ease of writing, categorization, prioritization, context, and ease of review. The quality and coverage of mind map test cases may be much better than other types of test cases. Using mind maps to write test cases enables testers to quickly create more test cases in a short span of time and participate in improved brainstorming on the test cases, either individually or as a group. Mind map tests cases present information in a format that clearly depicts the overall structure of all test cases, which assists in dividing large topics into manageable subtopics without overlooking any important topics. Mind map test cases may be easily and quickly reviewed by a team of testers and by development and product management teams, thereby facilitating the provision of useful feedback.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for translating mind maps to test management utility test cases.

In the prior art process for writing test cases, the amount of information to be keyed in for every test case and the template used by test management utilities can often be a hindrance in deriving a good coverage of test scenarios because test management utilities require a tester to enter parameters for a large number of fields, with many of the fields including redundant parameters or trivial details. This lengthy and time consuming process may create a disconnect between a tester thinking about test cases and the tester writing test cases. Furthermore, the context of the test cases for a given use case may be difficult to understand in the test reports generated by many test management utilities. Reviewing and updating a test case recorded in a test management utility may be a challenge due to the lack of context of the test scenarios, a sometimes excessive amount of test case details, and the complexity of the test management utility.

Embodiments herein offer solutions to prior art problems by extending the functionality of mind maps to the writing of test cases. An advantage with using mind maps to write test cases is the ease of writing, categorization, prioritization, context, and ease of review. The quality and coverage of mind map test cases may be much better than other types of test cases. Using mind maps to write test cases enables testers to quickly create more test cases in a short span of time and participate in brainstorming on the test cases, either individually or as a group. Mind map tests cases present information in a format that clearly depicts the overall structure of all test cases, which assists in dividing large topics into manageable subtopics without overlooking any important topics. Mind map test cases may be easily and quickly reviewed by a team of testers and by development and product management teams, thereby facilitating the provision of useful feedback.

Figure 2:
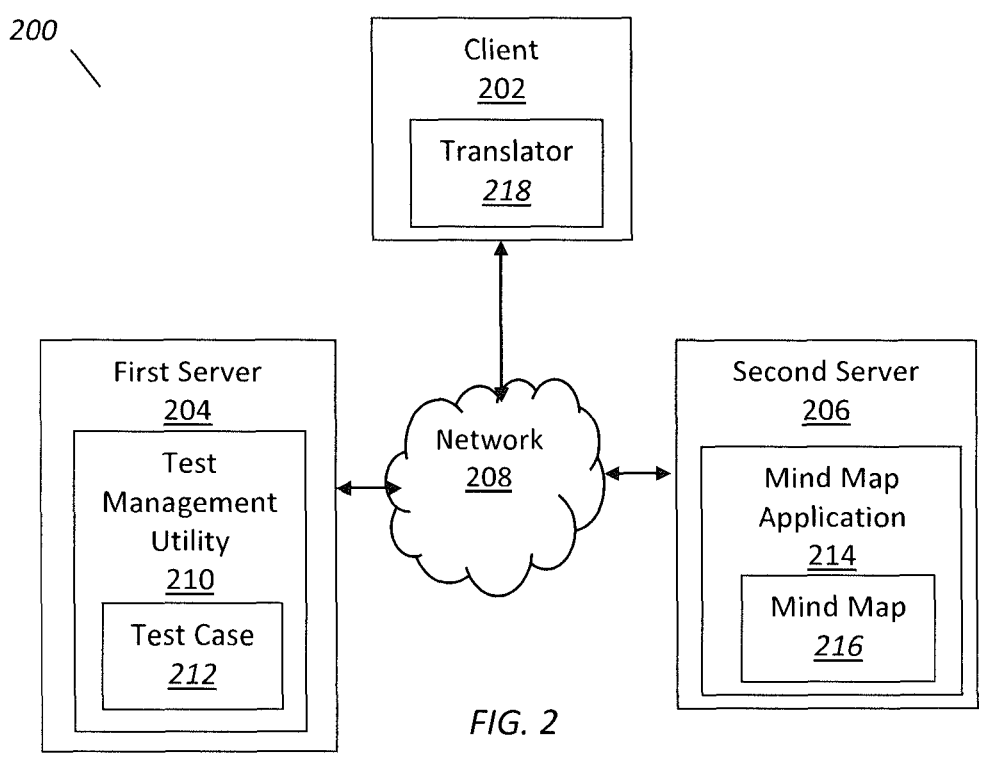
FIG. 2 illustrates a block diagram of an example system for translating mind maps to test management utility test cases, under an embodiment.

FIG. 2 illustrates a block diagram of a system that provides a translator for translating mind maps to test management utility test cases, under an embodiment. The translator may be portable, such that it can translate mind maps to test management utility test cases in many different environments. The translator is scalable, such that the translator may translate mind maps to test management utility test cases for a distributed system of anywhere from two computers to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202, a first server 204, and a second server 206 that are provided by a hosting company. The client 202 and the servers 204-206 communicate via a network 208. Although FIG. 2 depicts the system 200 with one client 202, two servers 204-206, and one network 208, the system 200 may include any number of clients 202, any number of servers 204-206, and any number of networks 208. Each of the client 202 and the servers 204-206 is substantially similar to the system 100 depicted in FIG. 1. The client 202 enables a user to communicate with the servers 204-206 in a distributed system. Alternatively, the client 202 and the mind map application 214 could very well be part of a single system.

The first server 204 includes a test management utility 210 that is used to write a test case 212, and the second server 206 includes a mind map application 214 that is used to create a mind map 216. The test management utility 210 could be a proprietary product such as Hewlett Packard® Quality Center test management utility, etc., or an open source test management utility product. The mind map 216 is created by the mind map application 214, e.g.: FreeMind® mind mapping application. While FIG. 2 depicts a translator 218 that is executed by the client 202 and as residing in the client 202, the translator 218 may also reside partially or wholly in the servers 204-206, such that the client 202 accesses the translator 218 via the servers 204-206 to execute the translator 218.

The translator 218 exports the mind map 216 to a text file from the mind map application 214. Exporting the mind map 216 to a text file enables the translator 218 to readily access each of the mind map nodes in the mind map 216.

The translator 218 populates the integration properties file with the exported text file location. The translator 218 uses the integration properties file to integrate the text file for the mind map 216 into the test case details for the test case 212. The exported text file location enables the integration properties file to locate the exported text file of the mind map 216 for integration.

The translator 218 may also populate the integration properties file with access enabling information for the test management utility 210, wherein the access enabling information comprises login credentials for the test management utility. If the test management utility 210 requires the submission of access enabling information, such as login credentials, prior to granting access, the translator 218 populates the integration properties file with the required access enabling information.

The translator 218 defines mapping, in the integration properties file, between the mind map's nodes and the test case 212 for the test management utility 210. The mapping in the integration properties file between the mind map's nodes and the test case enables each location for the mind map nodes to be mapped to the test case 212.

The translator 218 may also determine whether step details are to be captured. Test cases are typically written as a series of steps, and a user of the system 200 has the option of determining whether the user will need to enter details for each of the steps in the test case 212 or whether the user believes that the nodes for the mind map 216 are sufficiently clear for reviewing the test case 212, such that it is not necessary to enter details for each step. If step details are to be captured, the translator 218 may set a property "file type" to "steps" in the integration property file, which results in prompting the user to enter each of the step details. If step details are not to be captured, the translator 218 may set the property "file type" to "test" in the integration property file, which results in the user not being required to enter each of the step details.

The translator 218 sets the mapping between the mind map nodes and the test case details for the test case 212 based on the integration properties file. Since the mind map nodes have already been mapped to the test case 212, the translator 218 completes the mapping process by mapping the mind map nodes to the test case details for the test case 212, such that the location of each individual mind map node is now mapped to the location for entering each test case detail for the test case 212.

The translator 218 populates the test management utility 210 with the test case details present in the mind map nodes. The translator 218 derives the test case details from the mind map nodes by using the mapping rules present in the integration properties of the translator 218.

The translator 218 optionally determines whether the test case details include the mind map nodes. The translator 218 verifies whether the mapping and population acts have been executed accurately before informing the user of the system 200 about the verification. If the test case details include the mind map nodes, the translator 218 may output a verification message via a user interface, such as the client 202. If the test case details do not include the mind map nodes, the translator 218 may output an error message via a user interface, such as the client 202.

The translator 218 can be extended to read data from any available mind mapping application and export it to any available test management utility. The translator 218 offers solutions to prior art problems by extending the functionality of mind maps to the writing of test cases. An advantage with using the mind map 216 to write the test case 212 is the ease of writing, categorization, prioritization, context, and ease of review. The quality and coverage of mind map test cases may be much better than other types of test cases. Using the mind map 216 to write the test case 212 enables testers to quickly create more test cases in a short span of time and participate in brainstorming on the test case 212, either individually or as a group. Mind map tests cases present information in a format that clearly depicts the overall structure of all test cases, which assists in dividing large topics into manageable subtopics without overlooking any important topics. Mind map test cases may be easily and quickly reviewed by a team of testers and by development and product management teams, thereby facilitating the provision of useful feedback.

Figure 3:
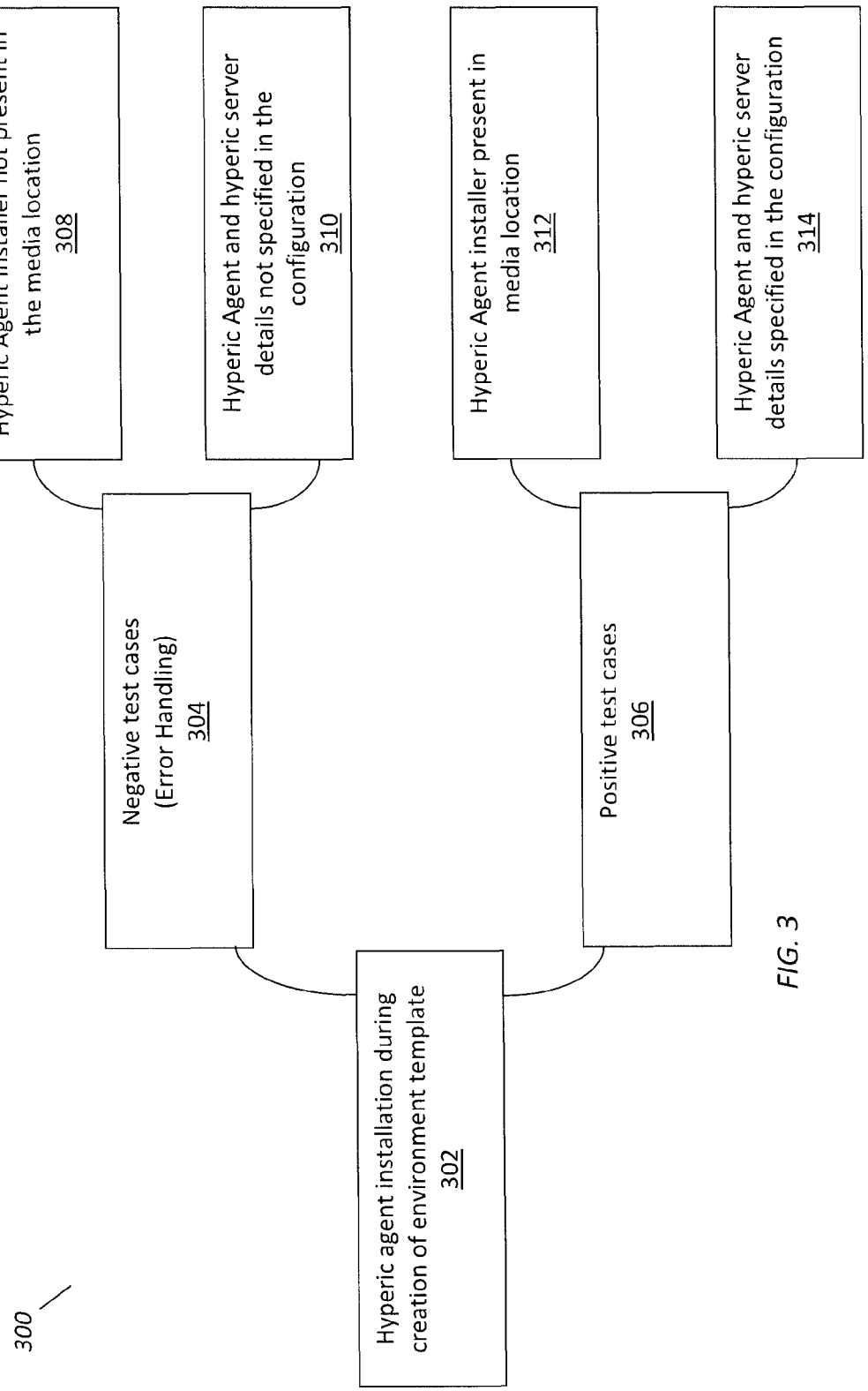
FIG. 3 illustrates a block diagram of an example mind map, under an embodiment.

FIG. 3 illustrates a block diagram of an example mind map, under an embodiment. The mind map 300 includes one central node 302, two secondary nodes 304 and 306, and four tertiary nodes 308, 310, 312, and 314. Although the mind map 300 includes three levels, a primary level for the central node 302, a second level for the secondary nodes 304 and 306, and a third level for the tertiary nodes 308, 310, 312, and 314, the mind map 300 may include any number of levels and any corresponding number of nodes. The mind map 300 may be created by a mind mapping application such as the Freemind® mind mapping application.

The mind map 300 begins with the central node 302, which begins a test case with the installation of a hyperic agent into a virtual machine. The mind map 300 contains two positive test cases and two negative test cases which could be part of the error handling scenarios for the underlying product being tested. The positive test cases 306 include validation of successful Hyperic Agent installation when the Hyperic Agent installer is present in the media location 312. Similarly, a positive test case 314 is about successful validation of Hyperic Agent installation when the Hyperic Server and Hyperic Agent details are specified in the configuration. The negative test cases 304 validates the exception handling and user friendly error messages if 308 Hyperic Agent installer is not found in the media location and 310, and if Hyperic Server and Hyperic Agent details are not specified in the configuration.

Figure 4:
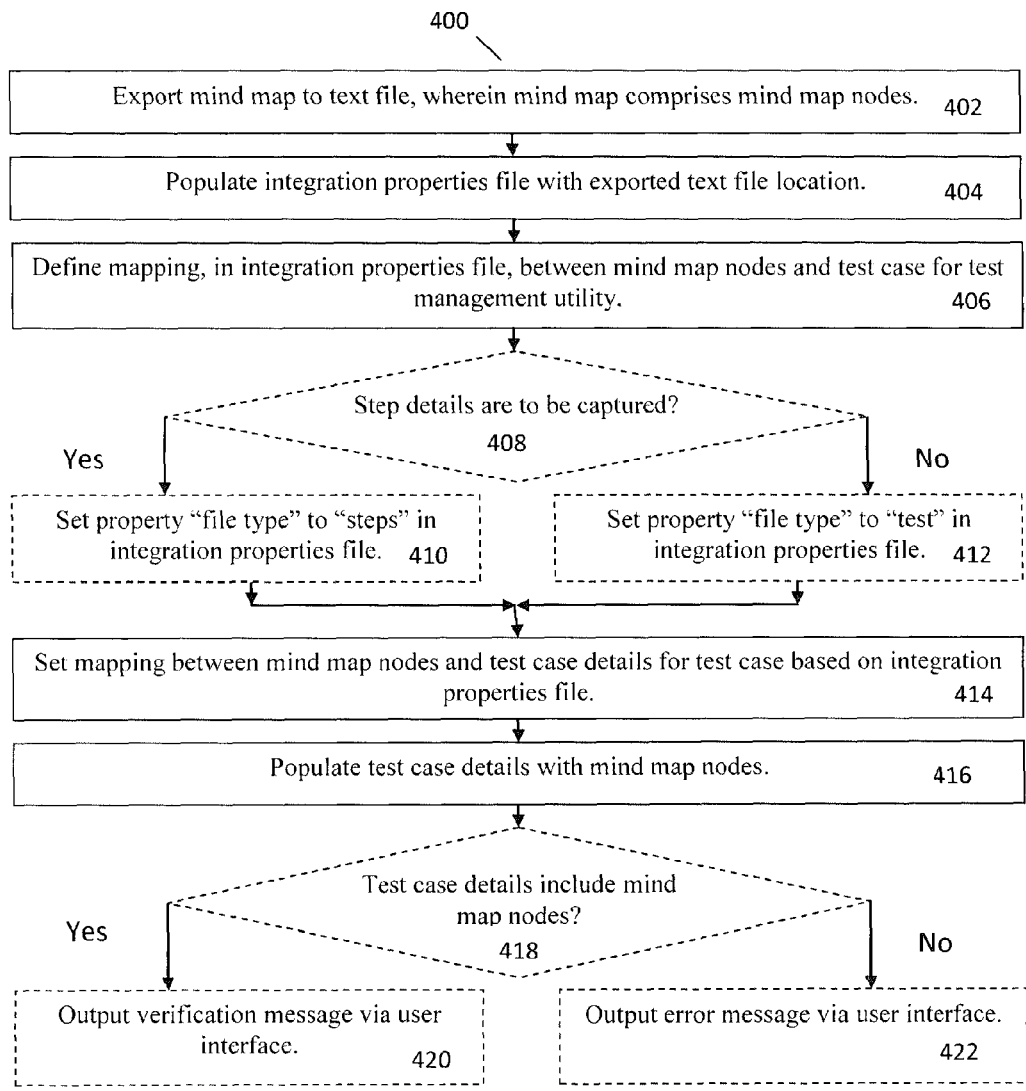
FIG. 4 is a flowchart that illustrates a method of translating mind maps to test management utility test cases, under an embodiment.

FIG. 4 is a flowchart that illustrates a method for translating mind maps to test management utility test cases. Flowchart 400 illustrates method acts illustrated as flowchart blocks for certain steps involved in and between the client 202 and the servers 204-206 of FIG. 2.

A mind map is exported to a text file, wherein the mind map comprises mind map nodes, act 402. For example, the translator 218 exports the mind map 300 for a hyperic agent installation test case to a text file, wherein the mind map 300 includes the mind map nodes 302-314 for the hyperic agent installation test case.

An integration properties file is populated with an exported text file location, act 404. For example, the translator 218 populates an integration properties file with the location of the text file for the mind map 300 for the hyperic agent installation test case, and with the login credentials for the test management utility 210.

Mapping is defined in the integration properties file between mind map nodes and a test case for a test management utility, act 406. For example, the translator 218 defines the mapping in the integration properties file between the mind map nodes 302-314 for the hyperic agent installation test case and the test case 212 for the test management utility 210.

A determination is made whether step details are to be captured, act 408. For example, the translator 218 prompts a user of the client 202 to determine whether step details are to be captured. If step details are to be captured, the method 400 continues to act 410. If step details are not to be captured, the method 400 proceeds to act 412.

A property "file type" is set to "steps" in the integration properties file, act 410. For example, the translator 218 sets the property "file type" to "steps" in the integration properties file. Then the method 400 proceeds to act 414.

A property "file type" is set to "test" in the integration properties file, act 412. For example, the translator 218 sets the property "file type" to "test" in the integration properties file. Then the method 400 continues to act 414.

Mapping is set between mind map nodes and test case details for a test case, act 414. For example, the translator 218 sets the mapping between the mind map nodes 302-314 for the hyperic agent installation test case and the test case details for the test case 212 in the integration properties file.

The test case details are populated with the mind map nodes, act 416. For example, the translator 218 populates the test case details for the test case 212 in the test management utility 210 with the mind map nodes 302-314 for the hyperic agent installation test case.

A determination is optionally made whether the test case details include the mind map nodes, act 418. For example, translator 218 determines whether the test case details for the test case 212 include the mind map nodes 302-314 for the hyperic agent installation test case. If the test case details for the test case 212 include the mind map nodes 302-314, the method 400 continues to act 420. If the test case details for the test case 212 do not include the mind map nodes 302-314, the method 400 proceeds to act 422.

A verification message is optionally output via a user interface, act 420. For example, the translator 218 outputs a verification message about the hyperic agent installation test case via the client 202.

An error message optionally output via a user interface, act 422. For example, the translator 218 outputs an error message about the hyperic agent installation test case via the client 202.

Although FIG. 4 depicts the acts 402-422 occurring in a specific order, the acts 402-422 may occur in another order. An advantage with using the mind map 216 to write the test case 212 is the ease of writing, categorization, prioritization, context, and ease of review. The quality and coverage of mind map test cases may be much better than other types of test cases. Using the mind map 216 to write the test case 212 enables testers to quickly create more test cases in a short span of time and participate in brainstorming on the test case 212, either individually or as a group. Mind map tests cases present information in a format that clearly depicts the overall structure of all test cases, which assists in dividing large topics into manageable subtopics without overlooking any important topics. Mind map test cases may be easily and quickly reviewed by a team of testers and by development and product management teams, thereby facilitating the provision of useful feedback.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about: that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for translating mind maps to test management utility test cases, the system comprising:
   a translator executed on a computer and configured to
      export a mind map to a text file, wherein the mind map comprises mind map nodes;
      populate an integration properties file with an exported text file location;
      define mapping, in the integration properties file, between the mind map nodes and a test case for a test management utility;
      set the mapping between the mind map nodes and test case details for the test case based on the integration properties file; and
      populate the test case details with the mind map nodes.

2. The system of claim 1, wherein the mind map is created by a mind mapping application.

3. The system of claim 1, wherein the translator further populates the integration properties file with access enabling information for the test management utility, wherein the access enabling information comprises login credentials for the test management utility.

4. The system of claim 1, wherein the translator is further configured to determine whether step details are to be captured, and set a property file type to steps in the integration property file in response to a determination that step details are to be captured.

5. The system of claim 1, wherein the translator is further configured to determine whether step details are to be captured, and set the property file type to text in the integration property file in response to a determination that step details are not to be captured.

6. The system of claim 1, wherein the translator is further configured to determine whether the test case details comprise the mind map nodes, and output a verification message via a user interface in response to a determination that the test case details comprise the mind map nodes.

7. The system of claim 1, wherein the translator is further configured to determine whether the test case details comprise the mind map nodes, and output an error message via the user interface in response to a determination that the test case details do not comprise the mind map nodes.

8. A computer-implemented method for translating mind maps to test management utility test cases, the method comprising:
   exporting a mind map to a text file, wherein the mind map comprises mind map nodes;
   populating an integration properties file with an exported text file location;
   defining mapping, in the integration properties file, between the mind map nodes and test case for a test management utility;
   setting the mapping between the mind map nodes and test case details for the test case based on the integration properties file; and
   populating the test case details with the mind map nodes.

9. The method of claim 8, wherein the mind map is created by a mind mapping application.

10. The method of claim 8, further comprising populating the integration properties file with access enabling information for the test management utility, wherein the access enabling information comprises login credentials for the test management utility.

11. The method of claim 8, further comprising determining whether step details are to be captured, and setting the property file type to steps in the integration property file in response to a determination that step details are to be captured.

12. The method of claim 8, further comprising determining whether step details are to be captured, and setting the property file type to text in the integration property file in response to a determination that step details are not to be captured.

13. The method of claim 8, further comprising determining whether the test case details comprise the mind map nodes, and outputting a verification message via a user interface in response to a determination that the test case details comprise the mind map nodes.

14. The method of claim 8, further comprising determining whether the test case details comprise the mind map nodes, and outputting an error message via the user interface in response to a determination that the test case details do not comprise the mind map nodes.

15. A computer program product, comprising a non-transitory computer-readable medium having a computer-readable program code embodied therein, the computer-readable program code adapted to be executed by one or more processors to implement a method for translating mind maps to test management utility test cases, the method comprising:
   exporting a mind map to a text file, wherein the mind map comprises mind map nodes;
   populating an integration properties file with an exported text file location;
   defining mapping, in the integration properties file, between the mind map nodes and test case for a test management utility;
   setting the mapping between the mind map nodes and test case details for the test case; and
   populating the test case details with the mind map nodes.

16. The computer program product of claim 15, wherein the mind map is created by a mind mapping application.

17. The computer program product of claim 15, the method further comprising populating the integration properties file with access enabling information for the test management utility, wherein the access enabling information comprises login credentials for the test management utility.

18. The computer program product of claim 15, the method further comprising determining whether step details are to be captured, and setting a property file type to steps in the integration property file in response to a determination that step details are to be captured.

19. The computer program product of claim 15, the method further comprising determining whether step details are to be captured, and setting the property file type to text in the integration property file in response to a determination that step details are not to be captured.

20. The computer program product of claim 15, the method further comprising:
   determining whether the test case details comprise the mind map nodes,
   outputting a verification message via a user interface in response to a determination that the test case details comprise the mind map nodes and
   outputting an error message via the user interface in response to a determination that the test case details do not comprise the mind map nodes.

\* \* \* \* \*